US006157316A

United States Patent [19]

Okayama et al.

[11] Patent Number: 6,157,316

[45] Date of Patent: *Dec. 5, 2000

[54] SELECTIVE CALL RECEIVER WITH RECHARGEABLE BATTERY

[75] Inventors: Kouichiro Okayama, Fujiyoshida; Miki Yuyama, Oshino-mura, both of Japan

[73] Assignee: Kokusai Electric Co., Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/692,471

[22] Filed: Aug. 6, 1996

[30] Foreign Application Priority Data

Aug. 8, 1995 [JP] Japan .................................... 7-202380

[51] Int. Cl.[7] ........................................ H04Q 7/14

[52] U.S. Cl. .................. 340/825.44; 340/636; 455/38.3; 455/573; 320/162

[58] Field of Search ........................... 340/825.44, 311.1, 340/636, 825.07; 395/750.01; 364/707, 483; 455/38.3, 343, 573; 320/136, 160, 162, 164; 702/63; 713/321, 300, 340

[56] References Cited

U.S. PATENT DOCUMENTS

| | | | |
|---|---|---|---|
| 5,043,721 | 8/1991 | May | 340/825.44 |
| 5,115,182 | 5/1992 | Ehmke et al. | 320/160 |
| 5,239,286 | 8/1993 | Komatsuda | 340/636 |
| 5,363,312 | 11/1994 | Ninomiya | 364/483 |
| 5,365,221 | 11/1994 | Fennell et al. | 340/636 |
| 5,459,671 | 10/1995 | Duley | 364/483 |
| 5,512,886 | 4/1996 | Macko et al. | 340/825.07 |
| 5,638,540 | 6/1997 | Aldous | 395/750.01 |

*Primary Examiner*—Edwin C. Holloway, III

*Attorney, Agent, or Firm*—Antonelli, Terry, Stout & Kraus, LLP

[57] ABSTRACT

A selective call receiver includes a receiver circuit for receiving calling information and message information, a processor for processing the calling information to determine whether the calling information identifies the selective call receiver, a message memory for storing the message information if the processor determines that the calling information does identify the selective call receiver, a message information output circuit for outputting the message information stored in the message memory to a portable data processing apparatus, a power receiving terminal for receiving power from the portable data processing apparatus, a rechargeable battery for powering the selective call receiver, a detector for detecting a state of charge of the rechargeable battery, and a charging circuit, responsive to the detector, for charging the rechargeable battery with the power received by the power receiving terminal from the portable data processing apparatus.

2 Claims, 11 Drawing Sheets

FIG.2A

| Pin | Signal | I/O | Function | +/- |
|---|---|---|---|---|
| 1 | GND | | Ground | |
| 2 | D3 | I/O | Data bit 3 | |
| 3 | D4 | I/O | Data bit 4 | |
| 4 | D5 | I/O | Data bit 5 | |
| 5 | D6 | I/O | Data bit 6 | |
| 6 | D7 | I/O | Data bit 7 | |
| 7 | CE1 | I | Card enable | - |
| 8 | A10 | I | Address bit 10 | |
| 9 | OE | I | Output enable | - |
| 10 | A11 | I | Address bit 11 | |
| 11 | A9 | I | Address bit 9 | |
| 12 | A8 | I | Address bit 8 | |
| 13 | A13 | I | Address bit 13 | |
| 14 | A14 | I | Address bit 14 | |
| 15 | WE/PGM | I | Write enable | - |
| 16 | RDY/BSY | O | Ready/Busy | +/- |
| 17 | Vcc | | Power Supply | |
| 18 | Vpp1 | | Programming and | |
| | | | Peripheral Supply | |
| 19 | A16 | I | Address bit 16 | |
| 20 | A15 | I | Address bit 15 | |
| 21 | A12 | I | Address bit 12 | |
| 22 | A7 | I | Address bit 7 | |
| 23 | A6 | I | Address bit 6 | |
| 24 | A5 | I | Address bit 5 | |
| 25 | A4 | I | Address bit 4 | |
| 26 | A3 | I | Address bit 3 | |
| 27 | A2 | I | Address bit 2 | |
| 28 | A1 | I | Address bit 1 | |
| 29 | A0 | I | Address bit 0 | |
| 30 | D0 | I/O | Data bit 0 | |
| 31 | D1 | I/O | Data bit 1 | |
| 32 | D2 | I/O | Data bit 2 | |
| 33 | WP | O | Write protect | |
| 34 | GND | | Ground | |

FIG. 2B

| Pin | Signal | I/O | Function | +/- |
|---|---|---|---|---|
| 35 | GND | | Ground | |
| 36 | CD1 | O | Card Detect | - |
| 37 | D11 | I/O | Data bit 11 | |
| 38 | D12 | I/O | Data bit 12 | |
| 39 | D13 | I/O | Data bit 13 | |
| 40 | D14 | I/O | Data bit 14 | |
| 41 | D15 | I/O | Data bit 15 | |
| 42 | CE2 | I | Card enable | - |
| 43 | RFSH | I | Refresh | |
| 44 | RFU | | Reserved | |
| 45 | RFU | | Reserved | |
| 46 | A17 | I | Address bit 17 | |
| 47 | A18 | I | Address bit 18 | |
| 48 | A19 | I | Address bit 19 | |
| 49 | A20 | I | Address bit 20 | |
| 50 | A21 | I | Address bit 21 | |
| 51 | Vcc | | Power supply | |
| 52 | Vpp2 | | Programming and | |
| | | | Peripheral Supply 2 | |
| 53 | A22 | I | Address bit 22 | |
| 54 | A23 | I | Address bit 23 | |
| 55 | A24 | I | Address bit 24 | |
| 56 | A25 | I | Address bit 25 | |
| 57 | RFU | | Reserved | |
| 58 | RESET | I | Card Reset | + |
| 59 | WAIT | O | Extend bus cycle | - |
| 60 | RFU | | Reserved | - |
| 61 | REG | I | Register select | - |
| 62 | BVD2 | O | Battery voltage detect 2 | |
| 63 | BVD1 | O | Battery voltage detect 1 | |
| 64 | D8 | I/O | Data bit 8 | |
| 65 | D9 | I/O | Data bit 9 | |
| 66 | D10 | I/O | Data bit 10 | |
| 67 | CD2 | O | Card detect | - |
| 68 | GND | | Ground | |

SELECTIVE CALL RECEIVER WITH RECHARGEABLE BATTERY

BACKGROUND OF THE INVENTION

1. Field of the Invention

The present invention relates to a selective call receiver, and in particular to a selective call receiver for use with a portable data processing apparatus.

2. Description of the Related Art

FIG. 10 shows a conventional selective call receiver 100, hereinafter referred to simply as the receiver 100, commonly called a pager, which is in widespread use. The receiver 100 is small and light, and thus can easily be carried in a pocket, an attache case, a handbag, etc.

The receiver 100 receives a radio signal transmitted from a base station (not shown). The radio signal includes synchronizing information, calling information, and message information. The receiver 100 searches for the synchronizing information, and decodes the calling information and the message information when it detects the synchronizing information.

If the decoded calling information coincides with calling information assigned to the receiver 100 which is stored in the receiver 100, the receiver 100 stores the decoded message information and displays it on a display 102.

The receiver 100 is powered by a primary battery 101 such as a zinc-silver oxide battery, a zinc-air battery, etc. The primary battery 101 must be replaced about once a month.

Replacing the primary battery 101 of the receiver 100 every month or so is inconvenient, and therefore it would be advantageous to use a secondary battery, commonly called a rechargeable battery, instead of the primary battery 101 to power the receiver 100.

However, if a rechargeable battery were to be used to power the receiver 100, it would be necessary to provide the receiver 100 with a charging circuit for charging the rechargeable battery, and a connector for connecting the charging circuit to an AC/DC converter for converting AC power from a commercial power source into DC power for use by the charging circuit.

One new use for the receiver 100 which has recently been developed is to connect the receiver 100 to a portable data processing apparatus, such as a portable personal computer, to enable the portable data processing apparatus to display and process message information received by the receiver 100. One example of a portable personal computer is a notebook computer which can perform word processing, document storage, and other data processing operations.

The portable data processing apparatus is powered by a battery or an AC power supply both having a much higher power capacity than the battery which powers the receiver 100. If it were possible to power the receiver 100 with a rechargeable battery and to charge the rechargeable battery with power from the battery or the AC power supply of the portable data processing apparatus, the receiver 100 would be easier and more convenient to use.

SUMMARY OF THE INVENTION

Accordingly, an object of the present invention is to provide a selective call receiver powered by a rechargeable battery which is charged by power received from a portable data processing apparatus, and having the capability of transferring message information which it has received to the portable data processing apparatus.

In order to achieve the above object of the present invention, a selective call receiver according to the present invention includes a receiver circuit for receiving calling information and message information, a processor for processing the calling information to determine whether the calling information identifies the selective call receiver, a message memory for storing the message information if the processor determines that the calling information does identify the selective call receiver, a message information output circuit for outputting the message information stored in the message memory to a portable data processing apparatus, a power receiving terminal for receiving power from the portable data processing apparatus, a rechargeable battery for powering the selective call receiver, a detector for detecting a state of charge of the rechargeable battery, and a charging circuit, responsive to the detector, for charging the rechargeable battery with the power received by the power receiving terminal from the portable data processing apparatus.

BRIEF DESCRIPTION OF THE DRAWINGS

FIGS. 2A–2B show a PCMCIA standard.

DESCRIPTION OF THE PREFERRED EMBODIMENTS

Figure 1:
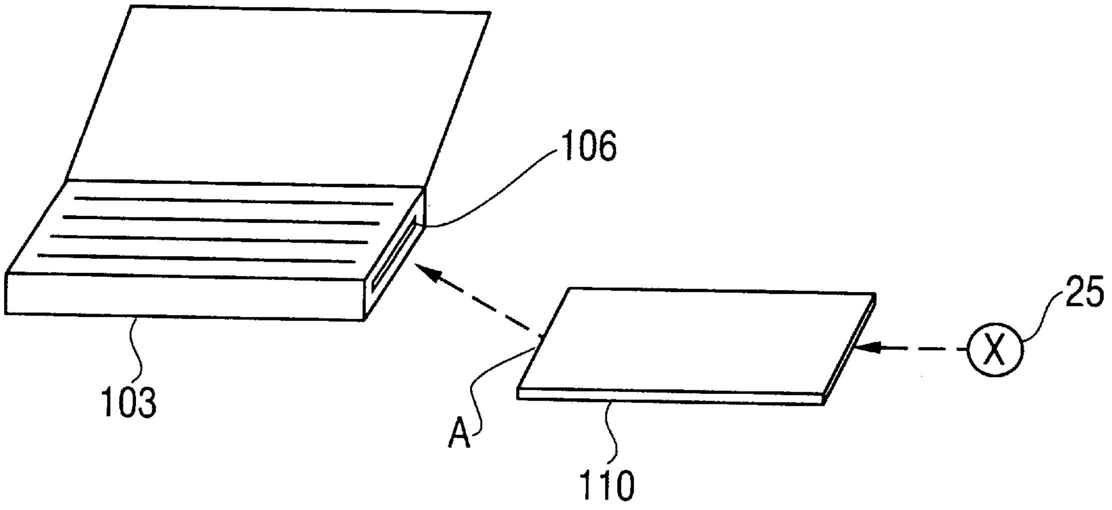
FIG. 1 shows a portable data processing apparatus having a PCMCIA card slot, and a selective call receiver according to the present invention which can be inserted into the PCMCIA card slot of the portable data processing apparatus.

Preferred embodiments of the present invention are described in detail below with reference to the drawings, in which like elements are identified by like reference numerals.

FIG. 1 shows a selective call receiver 110 according to the present invention, hereinafter referred to simply as the receiver 110, and a portable data processing apparatus 103, hereinafter referred to simply as the apparatus 103. The apparatus 103 may be, for example, a notebook computer which can perform word processing, document storage, and other data processing operations.

Figure 10:
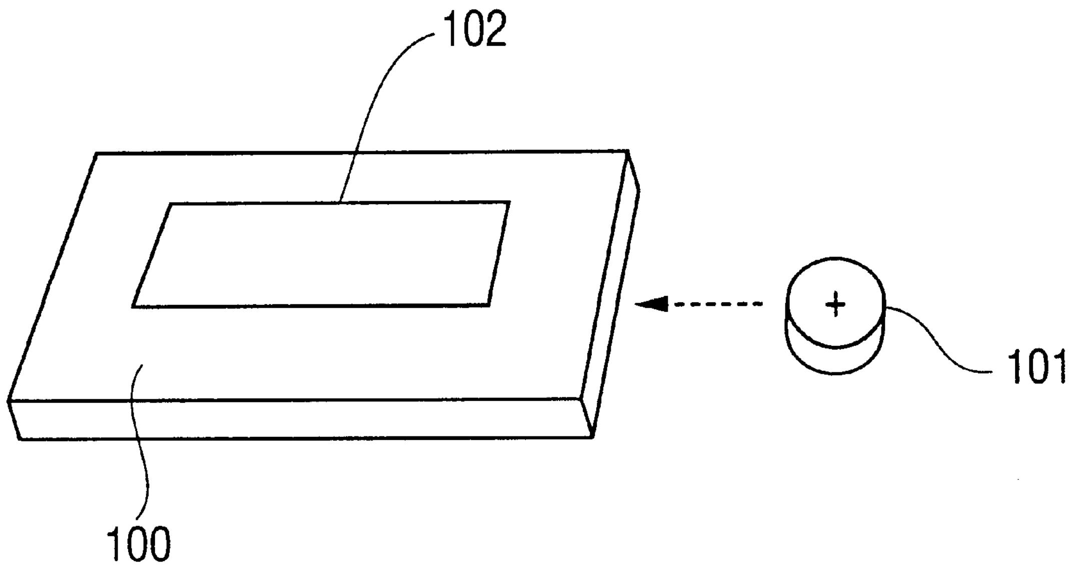
FIG. 10 shows a conventional selective call receiver.

The receiver 110 is powered by a rechargeable battery 25, hereinafter referred to simply as the battery 25, such as a nickel-cadmium battery or a lithium-sulfur battery, rather than by the primary battery 101 which powers the conventional receiver 100 as shown in FIG. 10.

The apparatus 103 has a PCMCIA card slot 106 into which a card conforming to the PCMCIA standard can be inserted. Such a card is typically called a PCMCIA card, but is also known as a PC Card.

PCMCIA stands for Personal Computer Memory Card International Association, an international organization which establishes international standards for various types of cards to be used with a personal computer. The PCMCIA standard was originally developed for memory cards, but is now used for many other types of cards.

FIGS. 2A–2B show the PCMCIA standard. The PCMCIA standard has sixty-eight pins, which include twenty-six pins for address lines (A0~A25), sixteen pins for data lines (D0~D15), two pins for power supply lines (VCC), four pins for ground lines (GND), two pins for card detection lines (−CD1, −CD2), one pin for a write enable control line (−WE/−PGM), one pin for a ready/busy control line (+RDY/−BSY), one pin for an output enable control line (−OE), one pin for a reset control line (+RESET), one pin for a wait control line (−WAIT), and thirteen pins for other types of lines as shown in FIGS. 2A–2B.

One side A of the receiver 110 has a size and a connector conforming to the PCMCIA standard to enable the receiver 110 to be inserted into the PCMCIA card slot 106 of the apparatus 103.

Figure 3:
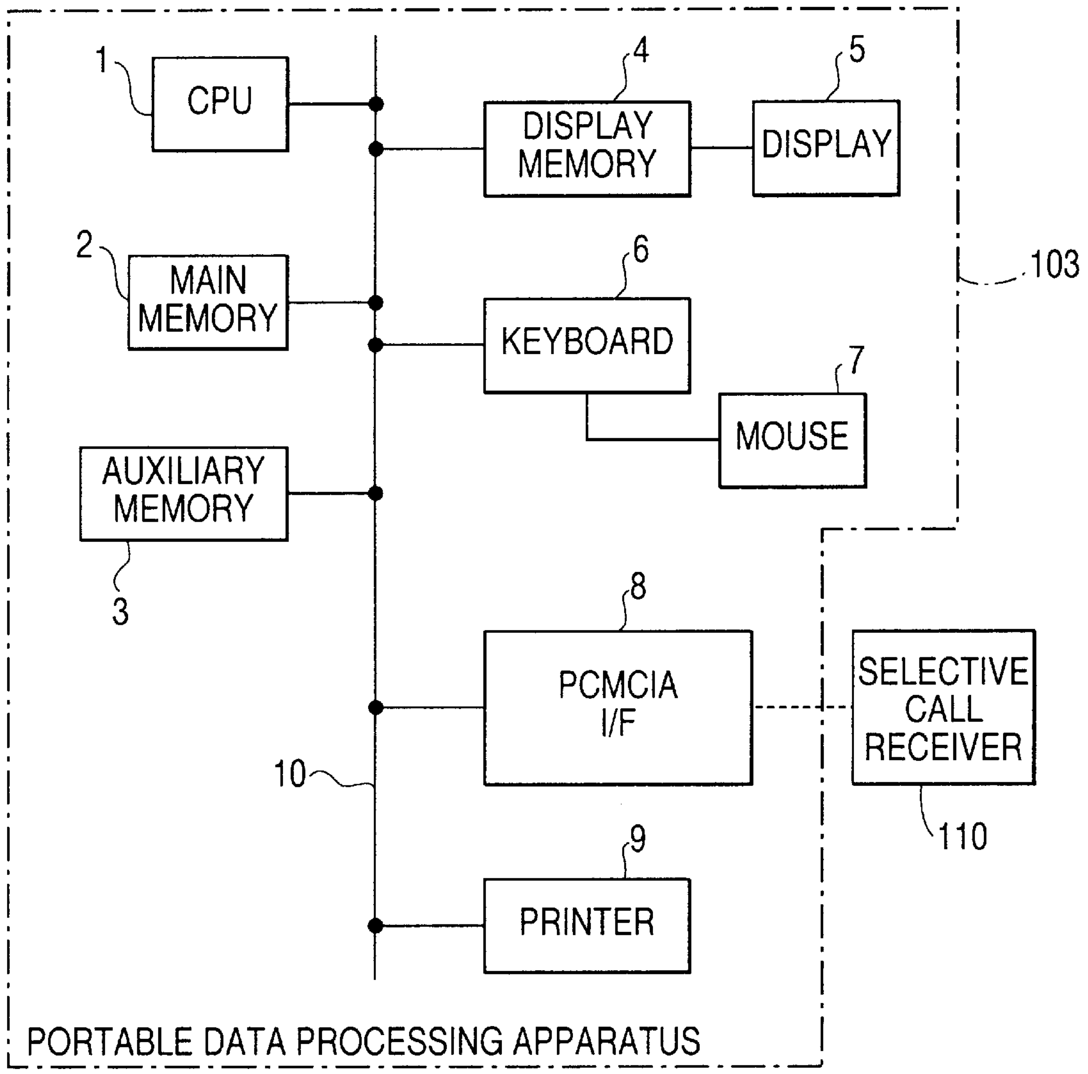
FIG. 3 shows a bus configuration of the portable data processing apparatus.

FIG. 3 shows a bus configuration of the apparatus 103. The apparatus 103 includes a central processing unit (CPU) 1, a main memory 2, an auxiliary memory 3, a display memory 4, a display 5, a keyboard 6, a PCMCIA interface (I/F) 8, and a printer 9, all of which are connected to a common bus 10. The common bus 10 includes data, address, and control lines, for example. The apparatus 103 also includes a mouse 7 which is connected to the common bus 10 via the keyboard 6. However, the mouse 7 may be connected directly to the common bus 10.

The CPU 1 performs word processing, document storage, and other data processing operations in accordance with programs stored in the main memory 2 and the auxiliary memory 3, and data and operating instructions input by a user via the keyboard 6 and the mouse 7. The CPU 1 stores display data produced when it performs data processing operations in the display memory 4, and displays the stored display data on the display 5, and prints out print data produced when it performs data processing operations on the printer 9.

When the receiver 110 is inserted into the PCMCIA card slot 106 of the apparatus 103, the receiver 110 is connected to the PCMCIA interface 8 as indicated by the dashed line in FIG. 3. The connection between the receiver 110 and the PCMCIA interface 8 will be described in greater detail below.

Figure 4:
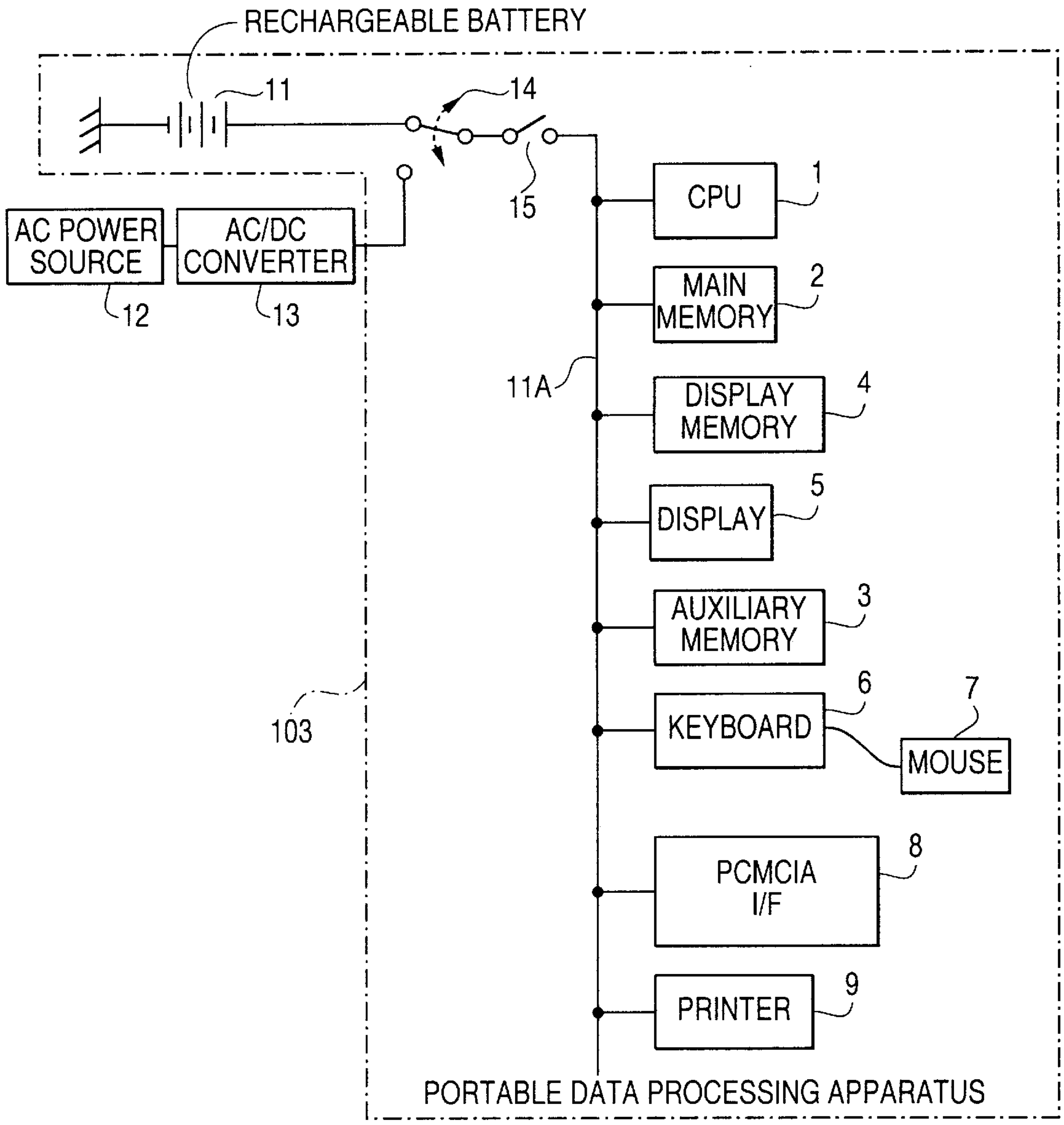
FIG. 4 shows a power supply configuration of the portable data processing apparatus.

FIG. 4 shows a power supply configuration of the apparatus 103. The apparatus 103 includes a battery 11, which is typically a rechargeable battery, a power supply selection switch 14, a power on/off switch 15, and a power supply line 11A.

The power supply selection switch 14 selects either the battery 11 or an AC/DC converter 13 provided outside the apparatus 103. The AC/DC converter 13 converts AC power from a commercial AC power source 12 to DC power. The power supply selection switch 14 supplies power from the selected power source (the battery 11 or the AC/DC converter 13) to the power on/off switch 15. The power on/off switch 15 supplies power to the power supply line 11A when it is turned on, and interrupts the supply of power to the power supply line 11A when it is turned off.

The power supply line 11A supplies power to the CPU 1, the main memory 2, the auxiliary memory 3, the display memory 4, the display 5, the keyboard 6, the PCMCIA interface 8, and the printer 9. The power supply line 11A also supplies power to the mouse 7 via the keyboard 6. However, the mouse 7 may be connected directly to the power supply line 11A.

Although the CPU 1, the main memory 2, the auxiliary memory 3, the display memory 4, the display 5, the keyboard 6, the PCMCIA interface 8, and the printer 9 are connected directly to the power supply line 11A, one or more of these devices may be connected to the power supply line 11A via an individual power on/off switch to enable the supply of power to the device to be individually turned on and off.

Figure 5:
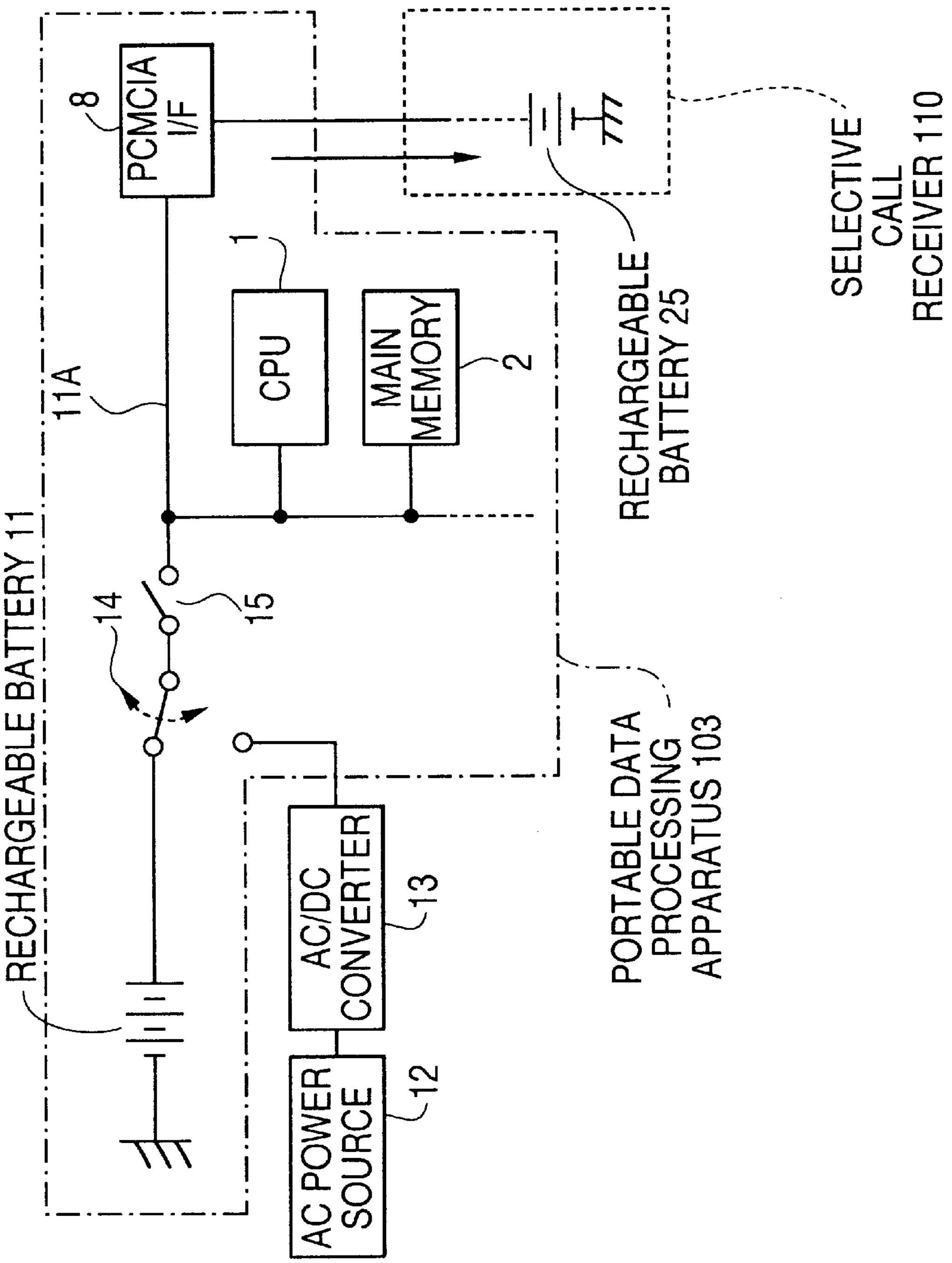
FIG. 5 shows a state where the selective call receiver has been inserted into the PCMCIA card slot of the portable data processing apparatus, and a rechargeable battery of the selective call receiver is being charged by power received from the portable data processing apparatus.

FIG. 5 shows a state where the receiver 110 has been inserted into the PCMCIA card slot 106 of the apparatus 103, such that the receiver 110 is connected to the PCMCIA interface 8 of the apparatus 103. This enables the battery 25 of the receiver 110 to be charged by power received from the apparatus 103 via the PCMCIA interface 8 as will be described in greater detail below.

Figure 6:
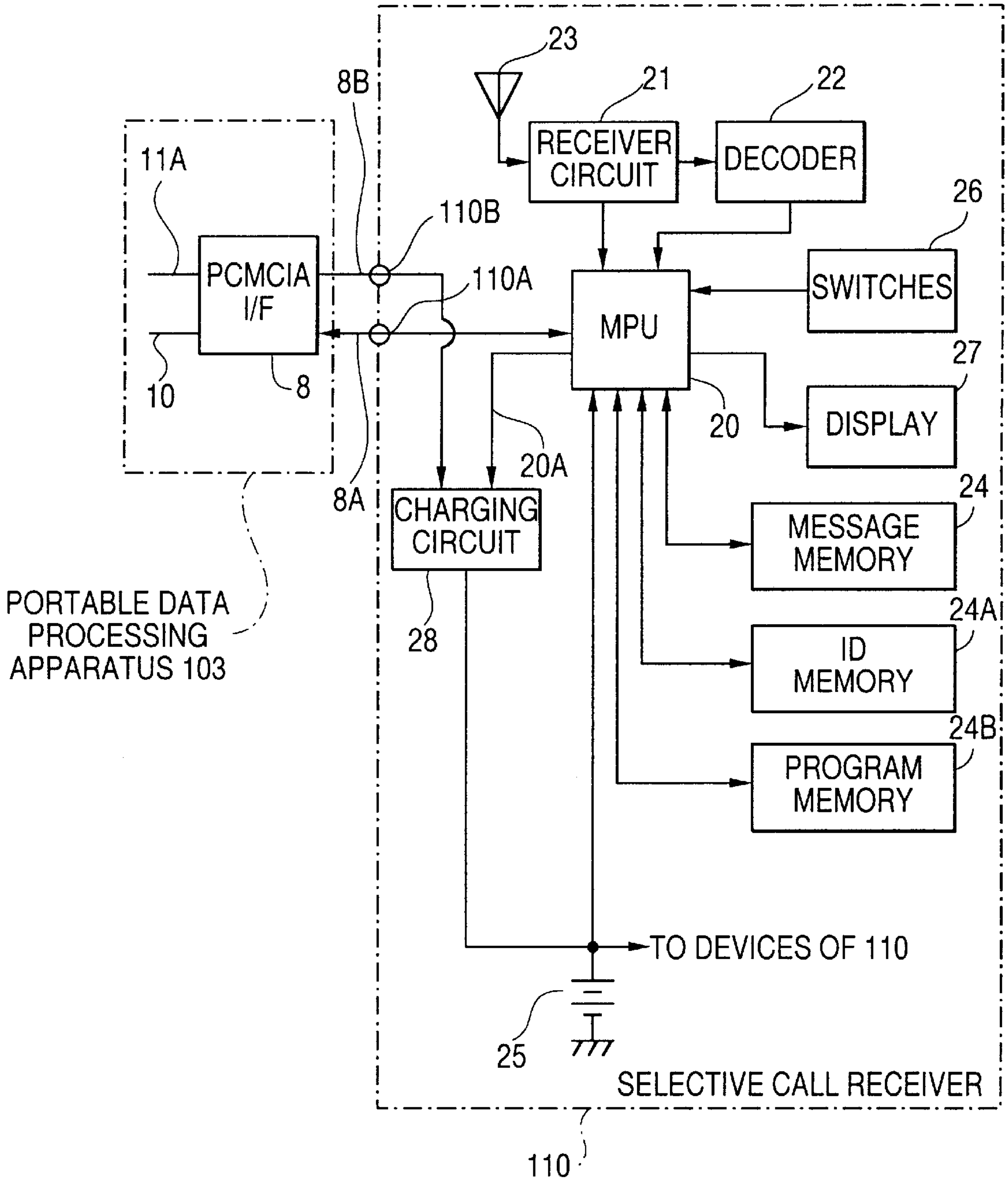
FIG. 6 shows the internal configuration of the selective call receiver, and the interconnections between the selective call receiver and the portable data processing apparatus when the selective call receiver has been inserted into the PCMCIA card slot of the portable data processing apparatus.

FIG. 6 shows the internal configuration of the receiver 110, and the interconnections between the receiver 110 and the apparatus 103 when the receiver 110 is connected to the PCMCIA interface 8 of the apparatus 103 as a result of the receiver 110 having been inserted into the PCMCIA card slot 106 of the apparatus 103. These interconnections are one of the main features of the present invention.

The receiver 110 includes a microprocessor unit (MPU) 20, a receiver circuit 21, a decoder 22, an antenna 23, a message memory 24, an ID memory 24A, a program memory 24B, the battery 25, switches 26, a display 27, and a charging circuit 29.

The battery 25 supplies power to the MPU 20, the receiver circuit 21, the decoder 22, the message memory 24, the ID memory 24A, the program memory 24B, the display 27, and the charging circuit 29, although the connections between the battery 25 and these devices are not specifically shown in FIG. 6.

The switches 26 enable the user to operate the receiver 110, and are typically actuated by buttons provided on a case of the receiver 110.

The MPU 20 controls the operation of the receiver 110 in accordance with a program stored in the program memory 24B and instructions from the user input via the switches 26.

The receiver circuit 21 receives via the antenna 23 a radio signal transmitted from a base station (not shown). The radio signal includes synchronizing information, calling information, and message information. The receiver circuit 21 demodulates the synchronizing information, the calling information, and the message information from the radio signal, and outputs the demodulated information to the decoder 22.

The decoder 22 searches for the synchronizing information, and decodes the calling information and the message information when it detects the synchronizing information.

The MPU 20 receives the decoded calling information from the decoder 22 and compares the decoded calling information with calling information assigned to the receiver 110 which is stored in the ID memory 24A. If the decoded calling information coincides with the calling information stored in the ID memory 24A, the MPU 20 receives the decoded message information from the decoder 22, stores the decoded message information in the message memory 24, and alerts the user that a message has been received by means of an alarm (not shown).

The alarm may be an audible alarm which produces an audible signal which the user can hear by using a buzzer or a speaker, for example, or may be a silent alarm which produces a non-audible signal which the user can feel by using a vibrator, for example. The receiver 110 may include both an audible alarm and a silent alarm, and may allow the user to select which one of the two alarms is to be used via the switches 26.

The message memory 24 has the capacity to store message information for a plurality of messages. The MPU 20 can display the stored message information on the display 27, which may be a liquid crystal display, in response to a request by the user input via the switches 26.

As described above, the PCMCIA interface 8 of the apparatus 103 is connected to the common bus 10 and the power supply line 11A of the apparatus 103. The PCMCIA interface 8 includes a bus 8A connected to the common bus 10, and a power supply line 8B connected to the power supply line 11A.

The receiver 110 includes a bus terminal 110A and a power supply terminal 110B. When the receiver 110 is inserted into the PCMCIA card slot 106 of the apparatus 103, the bus terminal 110A of the receiver 110 is connected to the bus 8A of the PCMCIA interface 8, and the power supply terminal 110B of the receiver 110 is connected to the power supply line 8B of the PCMCIA interface 8.

The bus 8A of the PCMCIA interface 8 and the bus terminal 110A of the receiver 110 are both connected to the pins 1–16, 18–50, and 52–68 of the PCMCIA standard shown in FIGS. 2A–2B. The power supply line 8B of the PCMCIA interface 8 and the power supply terminal 11B of the receiver 110 are both connected to the pins 17 and 51 (VCC) of the PCMCIA standard shown in FIGS. 2A–2B.

Thus, when the receiver 110 is inserted into the PCMCIA slot 106 of the apparatus 103, the receiver 110 is connected to the PCMCIA interface 8 of the apparatus 103 such that a bus interconnection is established between the receiver 110 and the apparatus 103 via the common bus 10, the bus 8A, and the bus terminal 110A, and a power supply interconnection is established between the receiver 110 and the apparatus 103 via the power supply line 11A, the power supply line 8B, and the power supply terminal 110B.

The charging circuit 29 is connected to the power supply terminal 110B and the battery 25, thereby enabling the charging circuit 29 to receive power from the power supply line 11A of the apparatus 103 via the PCMCIA interface 8 of the apparatus 103, and to use the received power to charge the battery 25. The charging circuit 29 is also connected to the MPU 20 via a control line 20A through which the MPU 20 controls the charging circuit 29 as will be described below.

The MPU 20 is connected to the battery 25 via a battery output voltage monitor line 25A through which the MPU 20 monitors the state of charge of the battery 25 as will be described below.

The operation of the receiver 110 when it is connected to the PCMCIA interface 8 of the apparatus 103 will now be described.

When the user wants to charge the battery 25 of the receiver 110, or to input message information stored in the message memory 24 of the receiver 110 into the apparatus 103, he inserts the receiver 110 into the PCMCIA card slot 106 of the apparatus 103, thereby connecting the receiver 110 to the PCMCIA interface 8 and establishing the bus and power supply interconnections between the receiver 110 and the apparatus 103 described above.

While the receiver 110 is connected to the PCMCIA interface 8, the MPU 20 monitors the state of charge of the battery 25 by monitoring the output voltage of the battery 25 via the battery output voltage monitor line 25A. However, any other known method of monitoring the state of charge of the battery 25 may be used.

If the output voltage of the battery 25 is not less than a reference voltage, the MPU 20 determines that the battery 25 is fully charged and thus does not to be charged.

If the output voltage of the battery 25 is less than the reference voltage, the MPU 20 determines that the battery 25 is not fully charged and thus needs to be charged, and outputs a charging start command to the charging circuit 29 via the control line 20A. In response to the charging start command, the charging circuit 29 starts charging the battery 25 with power received from the power supply line 11A of the apparatus 103 via the PCMCIA interface 8. Also, the MPU 20 alerts the user that charging of the battery 25 has started by means of the audible alarm described above (not shown), and outputs to the bus terminal 11OA information indicating that the battery 25 is being charged. The apparatus 103 receives that information via the PCMCIA interface 8 and displays a message such as "Charging," on the display 5. The MPU 20 may also display a similar message on the display 27 of the selective call receiver 110.

After the charging circuit 29 starts charging the battery 25, the MPU 20 continues to monitor the output voltage of the battery 25 via the battery output voltage monitor line 25A. As long as the output voltage of the battery 25 is less than the reference voltage, the MPU 20 allows the charging circuit 29 to continue charging the battery 25.

The output voltage of the battery 25 will gradually increase as it is being charged by the charging circuit 29, and will eventually increase to a point where it is no longer less than the reference voltage. When this occurs, the MPU 20 outputs a charging stop command to the charging circuit 29 via the control line 20A. In response to the charging stop command, the charging circuit stops charging the battery 25. Also, the MPU 20 alerts the user that charging of the battery 25 has stopped by means of the audible alarm described above (not shown), and outputs to the bus terminal 110A information indicating that the battery 25 is no longer being charged. The apparatus 103 receives that information via the PCMCIA interface 8 and clears the message such as "Charging" which has been displayed on the display 5. If the MPU 20 has been displaying a similar message on the display 27 of the selective call receiver 110 as described above, the MPU 20 also clears that message.

Although FIG. 6 shows that the charging circuit 29 is automatically controlled by the MPU 20 based on the output voltage of the battery 25, it may instead be manually controlled by one of the switches 26. In such a case, when the user wants start or stop charging the battery 25, he turns the switch 26 on or off, which causes the MPU 20 to output the charging start command or the charging stop command to the charging circuit 29 via the control line 20A.

Although FIG. 6 shows that the charging circuit 29 is provided in the receiver 110, it may instead be provided in the apparatus 103.

When the user wants to display or process the message information stored in the message memory 24 with the apparatus 103, he inputs an appropriate operating instruction to the apparatus 103 via the keyboard 6 or the mouse 7. In response to this operating instruction, the CPU 1 of the apparatus 103 outputs a message information request to the MPU 20 of the receiver 110 via the PCMCIA interface 8. In response to the message information request, the MPU 20 reads the message information stored in the message memory 24 and outputs the message information to the CPU 1 via the PCMCIA interface 8. The CPU 1 receives the message information, stores it in the display memory 4, and displays it on the display 5.

The user can instruct the apparatus 103 to display the messages represented by the message information on the display 5 one message at a time, all at once, or combined into a single block of text. The messages may be short or long, and may include a title or a date. The user can edit the messages displayed on the display 5 by inputting appropriate operating instructions to the apparatus 103 via the keyboard 6 or the mouse 7.

A program for controlling various functions of the receiver 110, such as setting the audio volume of the receiver 110 and setting the date and time in the receiver 110, may be stored in the auxiliary memory 3 of the apparatus 103, and may be automatically loaded by the CPU 1 of the apparatus 103 when the receiver 110 is inserted into the PCMCIA card slot 106 of the apparatus 103, thereby enabling the apparatus 103 to control other functions of the receiver 110 besides charging the battery 25 and retrieving message information stored in the message memory 24.

Alternatively, the program for controlling various functions of the receiver 110 may be stored in the program memory 24B of the receiver 110, and may be automatically downloaded to the CPU 1 of the apparatus 103 via the PCMCIA interface 8 when the receiver 110 is inserted into the PCMCIA card slot 106 of the apparatus 103.

Figure 7:
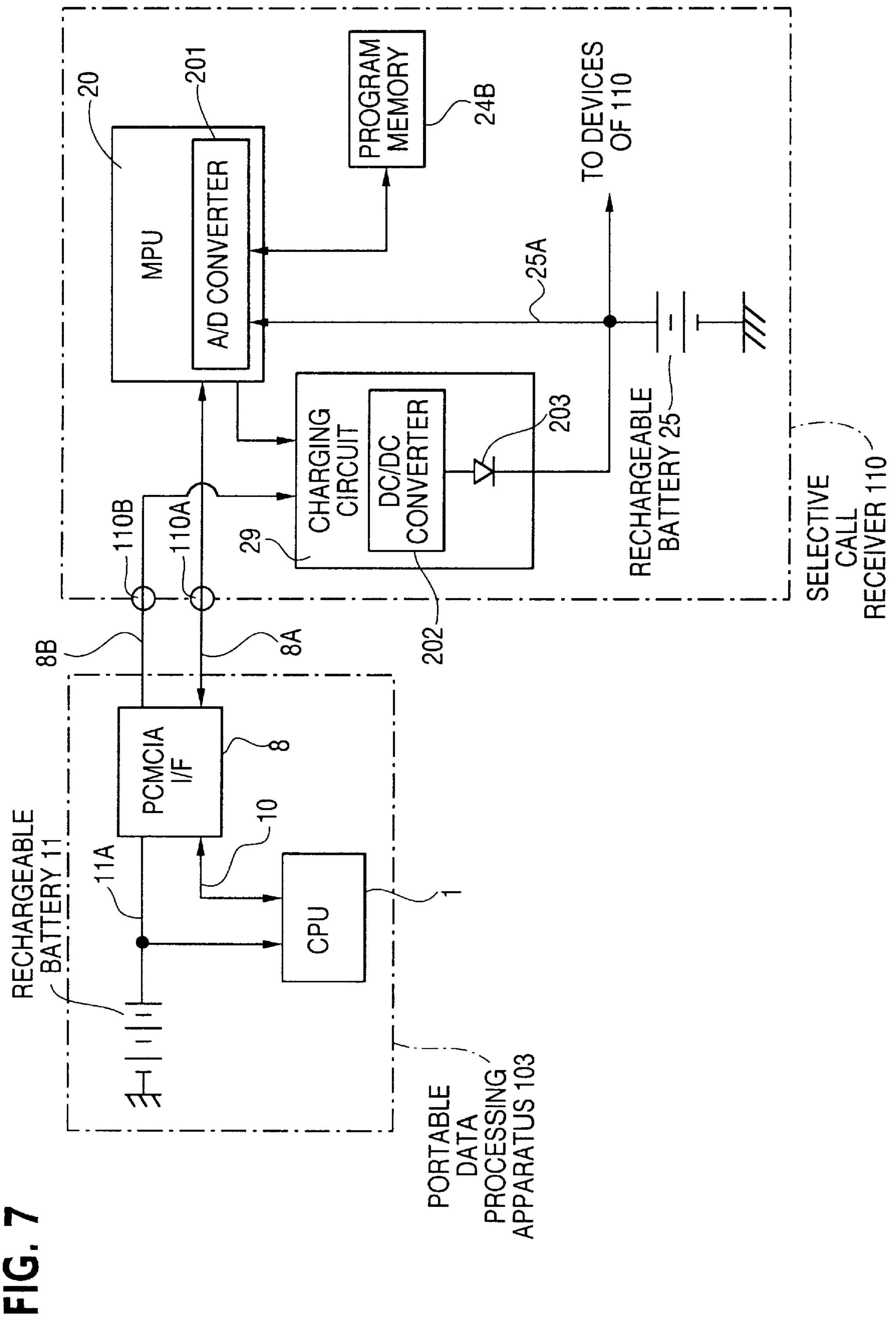
FIG. 7 shows a portion of FIG. 6 in greater detail.

FIG. 7 shows a portion of the block diagram in FIG. 6 in greater detail. The MPU 20 includes an A/D converter 201 which receives the output voltage of the battery 25 from the battery output voltage monitor line 25A. The A/D converter 201 converts the output voltage of the battery 25 to a digital value, and outputs the digital value of the output voltage of the battery 25. The MPU 20 compares the digital value of the output voltage of the battery 25 with a digital value of the reference voltage stored in the program memory 24B to determine whether the output voltage of the battery 25 is less than the reference voltage, and determines whether to output the charging start command or the charging stop command to the charging circuit 29 via the control line 20A based on a result of the comparison.

Alternatively, a comparator (not shown) may be provided in the receiver 110 and used instead of the A/D converter 201. In this case, the comparator receives the output voltage of the battery 25 from the battery output voltage monitor line 25A and the reference voltage, compares the output voltage of the battery 25 with the reference voltage to determine whether the output voltage of the battery 25 is less than the reference voltage, and outputs to the MPU 20 a comparison signal indicating whether the output voltage of the battery 25 is less than the reference voltage. The MPU 20 determines whether to output the charging start command or the charging stop command to the charging circuit 29 via the control line 20A based on the comparison signal. The MPU 20 may generate the reference voltage received by the comparator by converting a digital value of the reference voltage stored in the program memory 24B to an analog voltage using a D/A converter (not shown) included in the MPU 20.

As shown in FIG. 7, the charging circuit 29 includes a DC/DC converter 202 and a diode 203 for preventing current from flowing in the reverse direction from the battery 25 back to the charging circuit 29. The charging circuit 29 receives power from the power supply line 11A of the apparatus 103 via the PCMCIA interface 8 of the apparatus 103 at the operating voltage of the apparatus 103, which may be 12 volts, for example. When the charging circuit 29 receives the charging start command from the MPU 20 via the control line 20A, the charging circuit 29 converts the voltage of the power received from the apparatus 103 to the operating voltage of the receiver 110, which may be 1.5 volts, for example, using the DC/DC converter 202, and starts charging the battery 25 with the power having the converted voltage via the diode 203.

Figure 8:
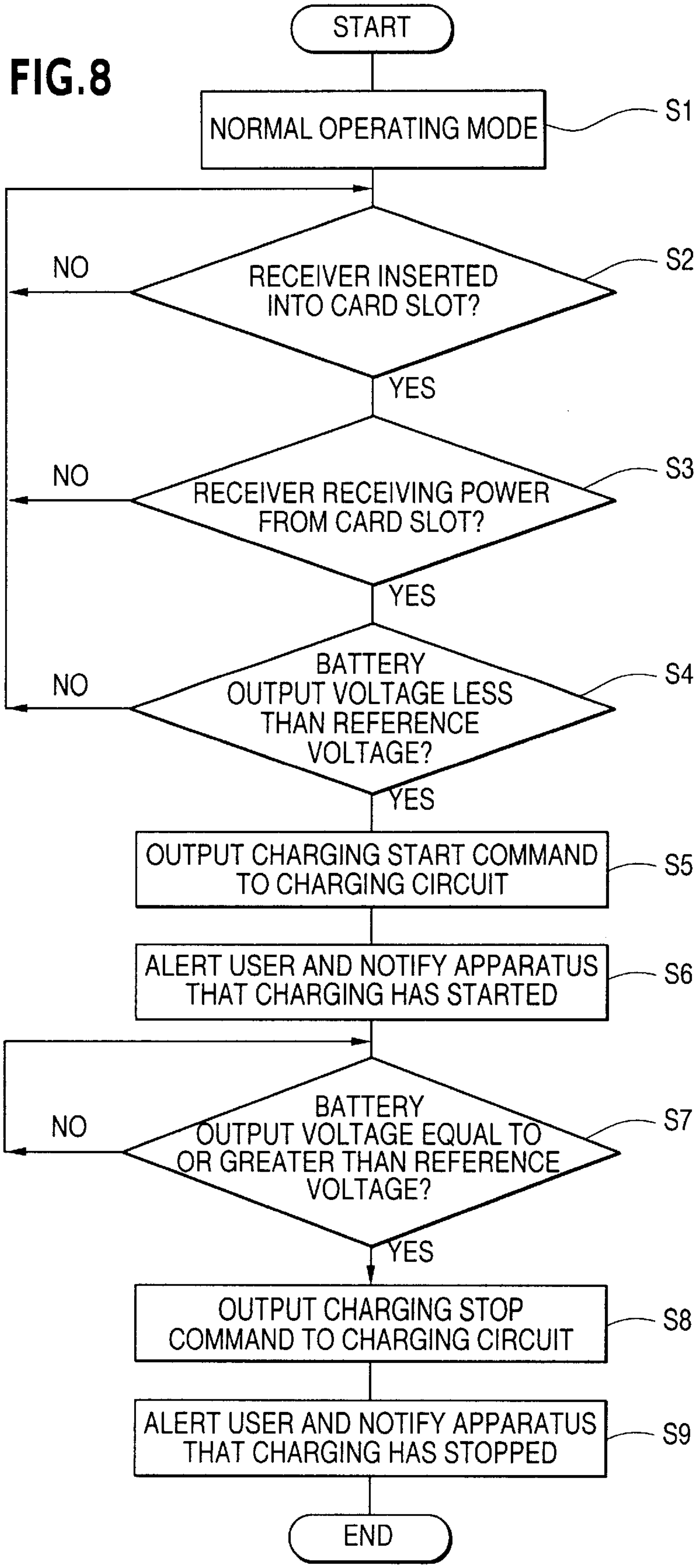
FIG. 8 is a flow chart showing a sequence of operations performed by a microprocessor unit of the selective call receiver during a charging operation which takes place when the selective call receiver is inserted into the PCMCIA card slot of the portable data processing apparatus.

FIG. 8 is a flow chart showing a sequence of operations performed by the MPU 20 of the receiver 110 during the charging operation which takes place when the receiver 110 is inserted into the PCMCIA card slot 106 of the apparatus 103 as described above.

In a step S1, when the receiver 110 is turned on, the MPU 20 controls the receiver 110 to enter a normal operating mode. The MPU 20 then goes to a step S2.

In the step S2, the MPU 20 determines whether the receiver 110 has been inserted into the PCMCIA card slot 106 of the apparatus 103.

If the MPU 20 determines in the step S2 that the receiver has not been inserted into the PCMCIA card slot 106, the MPU 20 repeats the step S2.

If the MPU 20 determines in the step S2 that the receiver 110 has been inserted into the PCMCIA card slot 106, the MPU 20 goes to a step S3.

In the step S2, the MPU 20 may determine whether the receiver 110 has been inserted into the PCMCIA card slot 106 by using a card detecting function provided by the pins 36 (−CD1) and 67 (−CD2) of the PCMCIA standard shown in FIG. 2B.

Alternatively, the MPU 20 may determine whether the receiver 110 has been inserted into the PCMCIA card slot 106 by using an insertion detection sensor provided in the receiver 110 which senses when the receiver 110 has been inserted into the PCMCIA card slot 106, or by using a manual switch provided on the case of the receiver 110 which is operated by the user when the receiver 110 is inserted into the PCMCIA card slot 106.

In the step S3, the MPU 20 determines whether the receiver 110 is receiving power from the power supply line 8B of the PCMCIA interface 8. This is necessary because the receiver 110 may have been inserted into a PCMCIA card slot of an apparatus which is not designed to supply power to the receiver 110 via the PCMCIA interface. In such a case, it will be impossible to charge the battery 25 of the receiver 110 with power from the apparatus.

If the MPU 20 determines in the step S3 that the receiver 110 is not receiving power from the power supply line 8B, the MPU 20 returns to the step S2.

If the MPU 20 determines in the step S3 that the receiver 110 is receiving power from the power supply line 8B, the MPU 20 goes to a step S4.

In the step S4, the MPU 20 monitors the output voltage of the battery 25 via the battery output voltage monitor line 25A, and determines whether the output voltage of the battery 25 is less than the reference voltage, which may be 1.45 volts, for example.

If the MPU 20 determines in the step S4 that the output voltage of the battery 25 is not less than the reference voltage, the MPU 20 goes back to the step S2.

If the MPU 20 determines in the step S4 that the output voltage of the battery 25 is less than the reference voltage, the MPU 20 goes to a step S5.

In the step S5, the MPU 20 outputs the charging start command to the charging circuit 29, which causes the charging circuit 29 to start charging the battery 25 with power received from the power supply line 8B of the PCMCIA interface 8. The MPU 20 then goes to a step S6.

In the step S6, the MPU 20 alerts the user that charging of the battery 25 has started by means of the audible alarm described above, and outputs to the bus terminal 11OA information informing the apparatus 103 that the battery 25 is being charged. The MPU 20 then goes to a step S7.

In the step S7, the MPU 20 monitors the output voltage of the battery 25 via the battery output voltage monitor line 25A while the charging circuit 29 is charging the battery 25, and determines whether the output voltage of the battery 25 is equal to or greater than the reference voltage.

If the MPU 20 determines in the step S7 that the output voltage of the battery 25 is not equal to or greater than the reference voltage, the MPU 20 repeats the step S7.

If the MPU 20 determines in the step S7 that the output voltage of the battery 25 is equal to or greater than the reference voltage, the MPU 20 goes to a step S8.

In the step S8, the MPU 20 outputs a charging stop command to the charging circuit 29, which causes the charging circuit 29 to stop charging the battery 25. The MPU 20 then goes to a step S9.

In the step S9, the MPU 20 alerts the user that charging of the battery 25 has stopped by means of the audible alarm described above (not shown), and outputs to the bus terminal 110A information informing the apparatus 103 that the battery 25 is no longer being charged.

Figure 9:
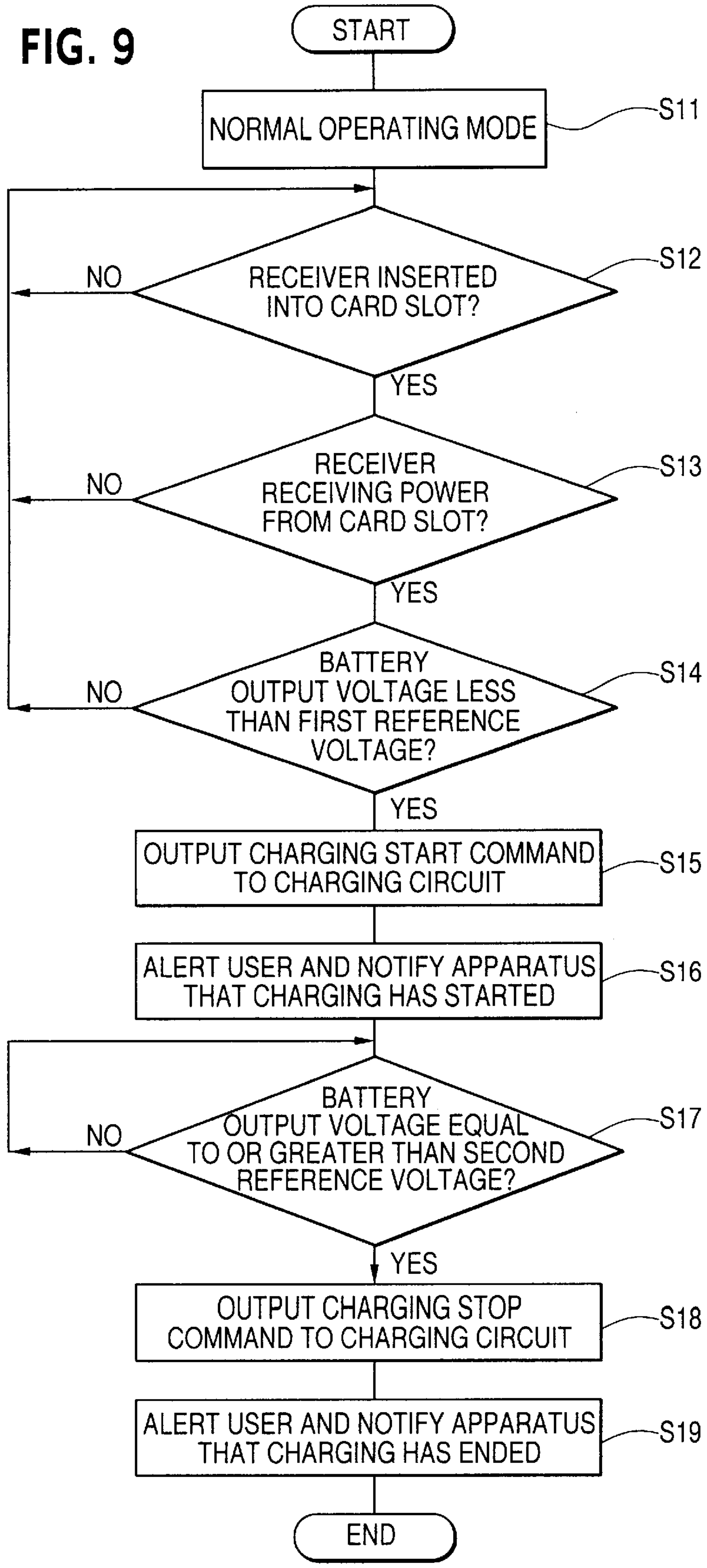
FIG. 9 is a flow chart showing a modified sequence of operations performed by the microprocessor unit of the selective call receiver during the charging operation which takes place when the selective call receiver is inserted into the PCMCIA card slot of the portable data processing apparatus.

FIG. 9 is a flow chart showing a modified sequence of operations performed by the MPU 20 of the receiver 110 during the charging operation which takes place when the receiver 110 is inserted into the PCMCIA card slot 106 of the apparatus 103 as described above.

In a step S11, when the receiver 110 is turned on, the MPU 20 controls the receiver 110 to enter a normal operating mode. The MPU 20 then goes to a step S12.

In the step S12, the MPU 20 determines whether the receiver 110 has been inserted into the PCMCIA card slot 106 of the apparatus 103.

If the MPU 20 determines in the step S12 that the receiver has not been inserted into the PCMCIA card slot 106, the MPU 20 repeats the step S12.

If the MPU 20 determines in the step S12 that the receiver 110 has been inserted into the PCMCIA card slot 106, the MPU 20 goes to a step S13.

In the step S12, the MPU 20 may determine whether the receiver 110 has been inserted into the PCMCIA card slot 106 by using a card detecting function provided by pins 36 (–CD1) and 67 (–CD2) of the PCMCIA standard shown in FIG. 2B.

Alternatively, the MPU 20 may determine whether the receiver 110 has been inserted into the PCMCIA card slot 106 by using an insertion detection sensor provided in the receiver 110 which senses when the receiver 110 has been inserted into the PCMCIA card slot 106, or by using a manual switch provided on the case of the receiver 110 which is operated by the user when the receiver 110 is inserted into the PCMCIA card slot 106.

In the step S13, the MPU 20 determines whether the receiver 110 is receiving power from the power supply line 8B of the PCMCIA interface 8. This is necessary because the receiver 110 may have been inserted into a PCMCIA card slot of an apparatus which is not designed to supply power to the receiver 110 via the PCMCIA interface. In such a case, it will be impossible to charge the battery 25 of the receiver 110 with power from the apparatus.

If the MPU 20 determines in the step S13 that the receiver 110 is not receiving power from the power supply line 8B, the MPU 20 returns to the step S12.

If the MPU 20 determines in the step S13 that the receiver 110 is receiving power from the power supply line 8B, the MPU 20 goes to a step S14.

In the step S14, the MPU 20 monitors the output voltage of the battery 25 via the battery output voltage monitor line 25A, and determines whether the output voltage of the battery 25 is less than a first reference voltage, which may be 1.15 volts, for example.

If the MPU 20 determines in the step S14 that the output voltage of the battery 25 is not less than the first reference voltage, the MPU 20 goes back to the step S12.

If the MPU 20 determines in the step S14 that the output voltage of the battery 25 is less than the first reference voltage, the MPU 20 goes to a step S15.

In the step S15, the MPU 20 outputs the charging start command to the charging circuit 29, which causes the charging circuit 29 to start charging the battery 25 with power received from the power supply line 8B of the PCMCIA interface 8. The MPU 20 then goes to a step S16.

In the step S16, the MPU 20 alerts the user that charging of the battery 25 has started by means of the audible alarm described above, and outputs to the bus terminal 110A information informing the apparatus 103 that the battery 25 is being charged. The MPU 20 then goes to a step S17.

In the step S17, the MPU 20 monitors the output voltage of the battery 25 via the battery output voltage monitor line 25A while the charging circuit 29 is charging the battery 25, and determines whether the output voltage of the battery 25 is equal to or greater than a second reference voltage, which may be 1.45 volts, for example.

If the MPU 20 determines in the step S17 that the output voltage of the battery 25 is not equal to or greater than the second reference voltage, the MPU 20 repeats the step S17.

If the MPU 20 determines in the step S17 that the output voltage of the battery 25 is equal to or greater than the second reference voltage, the MPU 20 goes to a step S18.

In the step S18, the MPU 20 outputs a charging stop command to the charging circuit 29, which causes the charging circuit 29 to stop charging the battery 25. The MPU 20 then goes to a step S19.

In the step S19, the MPU 20 alerts the user that charging of the battery 25 has stopped by means of the audible alarm described above (not shown), and outputs to the bus terminal 110A information informing the apparatus 103 that the battery 25 is no longer being charged.

As described above, a selective call receiver according to the present invention is powered by a rechargeable battery which is charged by power received from a portable data processing apparatus, and has the capability of transferring message information which it has received to the portable data processing apparatus. Thus, the selective call receiver according to the present invention is easier and more convenient to use than a conventional selective call receiver, and is more useful as well.

Although the present invention has been described in some detail with respect to several specific embodiments, the present invention is not limited to these embodiments, but includes various modifications of these embodiments which will be apparent to one of ordinary skill in the art. Accordingly, the scope of the present invention is to be determined only on the basis of the claims.

What is claimed is:

1. A selective call receiver comprising:

receiving means for receiving calling information and message information;

processing means for processing the calling information to determine whether the calling information identifies the selective call receiver;

storing means for storing the message information if the processing means determines that the calling information does identify the selective call receiver;

message information output means for outputting the message information stored in the storing means to a portable data processing apparatus;

power receiving means for receiving power from the portable data processing apparatus;

a rechargeable battery for powering the selective call receiver;

detecting means for detecting a state of charge of the rechargeable battery;

charging means, responsive to the detecting means, for charging the rechargeable battery with the power received by the power receiving means from the portable data processing apparatus; and sending means for sending to the portable data processing apparatus information indicating that the charging means has begun charging the rechargeable battery every time the charging means starts charging the rechargeable battery;

wherein the portable data processing apparatus includes:

a display; and means for displaying on the display a message indicating that the rechargeable battery is being charged in response to the information sent by the sending means every time the charging means is charging the rechargeable battery and only when the charging means is charging the rechargeable battery.

2. A selective call receiver comprising:

receiving means for receiving calling information and message information;

processing means for processing the calling information to determine whether the calling information identifies the selective call receiver;

storing means for storing the message information if the processing means determines that the calling information does identify the selective call receiver;

message information output means for outputting the message information stored in the storing means to a portable data processing apparatus;

power receiving means for receiving power from the portable data processing apparatus;

a rechargeable battery for powering the selective call receiver;

voltage detecting means for detecting an output voltage of the rechargeable battery, the output voltage of the rechargeable battery being indicative of a state of charge of the rechargeable battery;

comparing means for comparing the detected output voltage of the rechargeable battery with a first reference voltage and determining whether the detected output voltage of the rechargeable battery is less than the first reference voltage, and for comparing the detected output voltage of the rechargeable battery with a second reference voltage and determining whether the detected output voltage of the rechargeable battery is equal to or greater than the second reference voltage; and charging means, responsive to the comparing means, for charging the rechargeable battery with the power received by the power receiving means from the portable data processing apparatus;

wherein the charging means starts to charge the rechargeable battery when the comparing means determines that the detected output voltage of the rechargeable battery is less than the first reference voltage;

wherein the charging means stops charging the rechargeable battery when the comparing means determines that the detected output voltage of the rechargeable battery is equal to or greater than the second reference voltage;

wherein the selective call receiver further comprises sending means for sending to the portable data processing apparatus information indicating that the charging means has begun charging the rechargeable battery every time the charging means starts charging the rechargeable battery; and wherein the portable data processing apparatus includes:

a display; and means for displaying on the display a message indicating that the rechargeable battery is being charged in response to the information sent by the sending means every time the charging means is charging the rechargeable battery and only when the charging means is charging the rechargeable battery.

* * * * *